US005377638A

United States Patent [19]

Mueller

[11] Patent Number: 5,377,638

[45] Date of Patent: Jan. 3, 1995

[54] HYDRAULIC ADJUSTING DEVICE

[75] Inventor: Martin Mueller, Moeglingen, Germany

[73] Assignee: Robert Bosch GmbH, Stuttgart, Germany

[21] Appl. No.: 130,488

[22] Filed: Oct. 1, 1993

[30] Foreign Application Priority Data

Nov. 28, 1992 [DE] Germany ............................ 4240075

[51] Int. Cl.[6] ............................ F01L 1/34; F16D 3/10

[52] U.S. Cl. ............................ 123/90.17; 123/90.31; 464/2; 464/160

[58] Field of Search ............................ 123/90.17, 90.31; 464/1, 2, 160; 60/325

[56] References Cited

U.S. PATENT DOCUMENTS 4,787,345 11/1988 Thoma ............................ 123/90.17
5,111,780 5/1992 Hannibal ............................ 123/90.17
5,113,814 5/1992 Suga et al. ............................ 123/90.17
5,189,999 3/1993 Thoma ............................ 123/90.17
5,263,442 11/1993 Hara ............................ 123/90.31 X

FOREIGN PATENT DOCUMENTS 4128656 4/1993 Germany .

*Primary Examiner*—Edward K. Look
*Assistant Examiner*—Hoang Nguyen
*Attorney, Agent, or Firm*—Edwin E. Greigg; Ronald E. Greigg

[57] ABSTRACT

A hydraulic adjusting device for rotating a camshaft relative to its drive wheel which includes a coupling member, which cooperates with the drive wheel and with the camshaft via a pair of gear tooth systems, at least one of which is a helical gear. The coupling member is connected to an actuator, which is embodied as a single-acting cylinder. This singleacting cylinder is acted upon by pressure that is variable by a control valve. The restoration of the coupling member or of the actuator takes place only from the restoring moment upon the actuation of the valves of the engine by the camshaft.

24 Claims, 1 Drawing Sheet

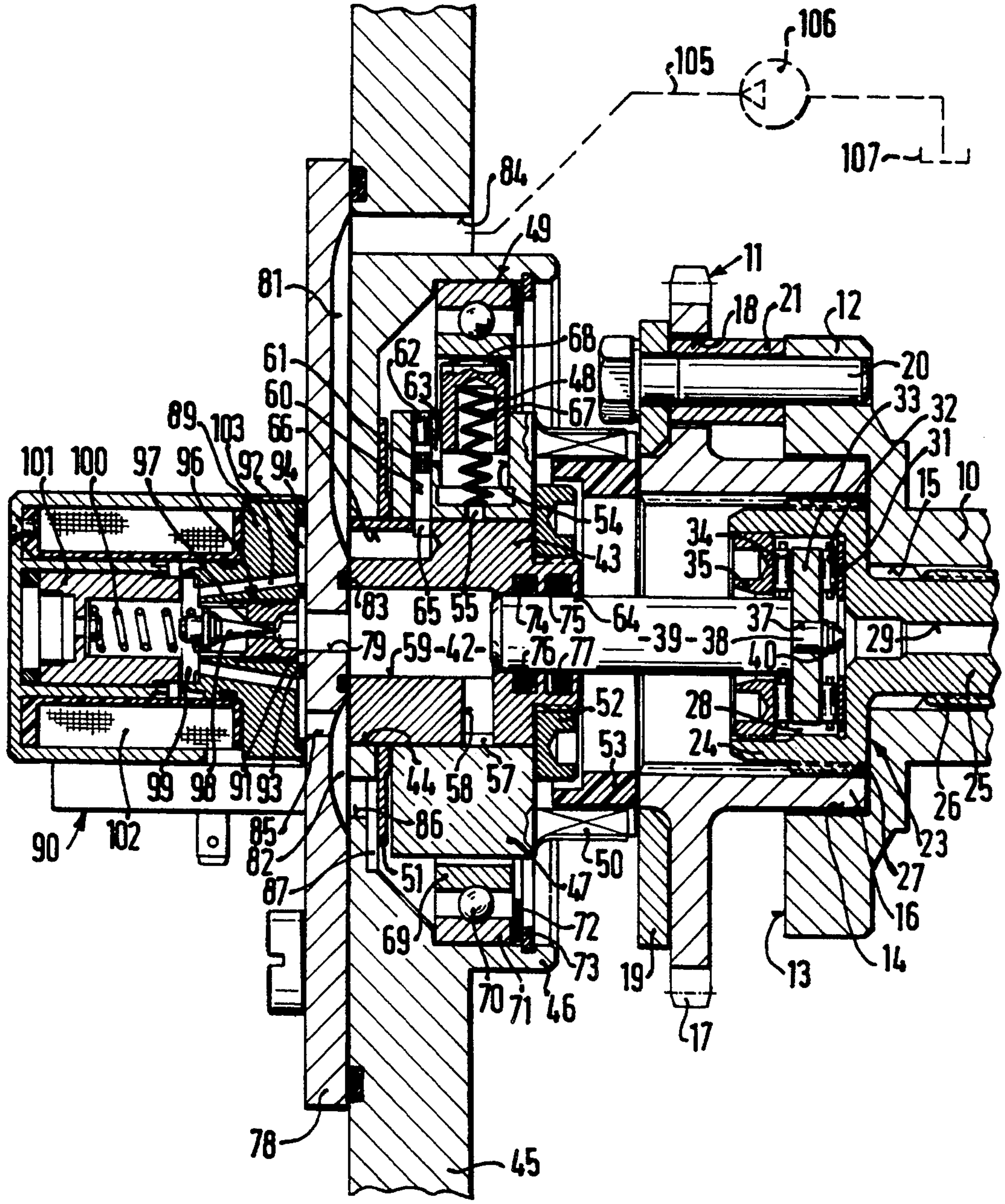
106
105
107
84
49
11
18
21
12
81
68
20
62
61
63
48
33
32
60
67
31
66
89
103
15
10
101
100
97
96
92
94
54
34
35
43
83
65
55
74
75
64
37
79
59
42
39
38
29
76
77
40
52
28
53
24
99
98
91
93
44
58
57
26
25
85
86
23
90
102
82
50
27
87
51
47
69
72
16
73
19
13
14
70
71
46
17
78
45

HYDRAULIC ADJUSTING DEVICE

BACKGROUND OF THE INVENTION

The invention is based on a hydraulic adjusting device as set forth hereinafter.

German Offenlegungsschrift 41 28 656, whose publication date is not prior to the priority date of the present application, discloses one such hydraulic adjusting device, in which the partial pressures in the pressure chambers of an actuator, embodied as a differential cylinder, can be varied via an electromagnetically actuatable control valve. The partial pressures in the pressure chambers are adjusted by means of a partial outflow of pressure fluid, and by suitable triggering of the control valve, these partial pressures are kept virtually constant. Given a stationary position of the actuator, the control valve is triggered such that the holding pressures are very much less than the adjusting pressures required for an adjusting motion. To that end, the annular face of the differential cylinder is always acted upon by pressure fluid by means of a pump, while the pressure chamber on the large piston face is built up via an overflow valve and is variable by means of the electromagnetically actuatable control valve. Such a hydraulic adjusting device is used in an internal combustion engine, for instance, in order to actuate a device for adjusting the camshaft relative to the crankshaft or the drive wheel. To adjust the camshaft, the actuator and the camshaft are connected to one another via a coupling member. This coupling member is longitudinally displaceable and has a gear tooth system that cooperates with a gear tooth system on the longitudinally stationary camshaft. A further gear tooth system cooperates with a corresponding one on the drive wheel. One of these two pairs of gear tooth systems is embodied as a spur gear, while the other is embodied as a helical gear. By the cooperation of these gear tooth systems, a translational motion of the actuator is converted into a rotational motion on the part of the camshaft. Because of their design, these devices require considerable space for installation and above all have a great length axially (in the direction of the longitudinal axis of the camshaft). Moreover, such devices require at least one actively controllable valve part and at least one further, passive, not arbitrarily controllable valve part.

OBJECT AND SUMMARY OF THE INVENTION

The hydraulic adjusting device according to the invention has an advantage over the prior art of being substantially simpler in design and of requiring less installation space.

Because of the simplified design of the hydraulic adjusting device, the expenditure for control technology is also reduced.

As a result of the embodiment of the hydraulic adjusting device according to the invention, it is possible for the restoring forces that always occur during operation to be utilized for an adjustment in one direction. Only for the adjustment in the opposite direction (that is, counter to the restoring force) are hydraulic pressure forces brought to bear.

Because of the simplified and hence shorter actuator, the pressure fluid conduits to and from the control valve are either absent or shorter in length. Because of the short axial length of the adjusting device, the control valve can be disposed coaxially to the camshaft without major effort and without taking up much space.

The invention will be better understood and further objects and advantages thereof will become more apparent from the ensuing detailed description of a preferred embodiment taken in conjunction with the drawing.

BRIEF DESCRIPTION OF THE DRAWING

The single figure of the drawing is a longitudinal section through a hydraulic adjusting device.

DESCRIPTION OF THE PREFERRED EMBODIMENT

In the drawing, 10 indicates the camshaft of an internal combustion engine, which is driven by an engine via a drive wheel 11 (chain wheel). The camshaft 10 has a flangelike end part 12, with a cylindrical indentation 14 let into its face end 13. A longitudinal bore 15 begins at this indentation 14 and penetrates the camshaft 10. The hollow-cylindrical hub body 16 of the drive wheel 11, on whose outer circumference the chain wheel 17 is mounted, protrudes into the cylindrical indentation 14. An annular disk 19 that encompasses the hub body 16 rests on the side of the chain wheel 17 remote from the end part 12. Drivers, not shown, are mounted on the annular disk 19 on the face end remote from the chain wheel 17; their function will be described in further detail hereinafter. The annular disk 19, the chain wheel 17 or the drive wheel 11, and the end part 12 of the camshaft 10 are connected to one another via bolts 20 and spacer sleeves 21. One end of the spacer sleeves 21 rest on the end part 12 and the other end rests on the annular disk 19 and pass through the chain wheel 17. To that end, the chain wheel has apertures 18 shaped like segments of a ring. These apertures 18 are embodied such that while the drive wheel 11 is fixed in the axial direction, it is rotatable by a defined angular range.

A coupling member 23 is guided in the interior of the hub body 16 and has its cylindrical portion 24 of larger diameter located in the interior of the hub body 16. Adjoining this cylindrical portion 24 is a further cylindrical portion 25 of lesser diameter, which protrudes into the longitudinal bore 15 of the camshaft 10. The coupling member 23 is guided longitudinally displaceably, but in a manner fixed against relative rotation, in the camshaft 10. To that end, the cylindrical portion 25 and the longitudinal bore 15 have a cooperating spur gear 26. The drive wheel 11 and the coupling member 23, conversely, cooperate via a helical gear 27, which is embodied on one side on the outer circumference of the cylindrical portion 24 and on the other on the inside circumference of the hub body 16.

The cylindrical portion 24 of the coupling member 23 has a cylindrical indentation 28, beginning at its free face end, and from which indentation a continuous longitudinal bore 29 originates, communicating with the longitudinal bore 15 in the camshaft 10. A bearing ring 31, on which a first roller bearing ring 32 rolls, is located on the bottom of the indentation 28. This first roller bearing ring 32 is adjoined by a guide disk 33, on the other side of which a second roller bearing ring 34 rests. The bearing disk 31, the first roller bearing ring 32, the guide disk 33 and the second roller bearing ring 34 are fixed by a ring nut 35 in the interior of the indentation 28 and form an axial bearing. The guide disk 33 has a central continuous bore 37, through which the guide mandrel 38 of the actuator 39 protrudes. This actuator 39 rests on the guide disk 33 in such a way that the guide mandrel 38 penetrates the bore 37 and is axially immovably secured on the opposite side of the guide disk by a securing ring 40. The actuator 39 protrudes through the second roller bearing ring 34, the ring nut 35, and the interior of the hub body 16 to reach the inside of a stepped, continuous longitudinal bore 42 of a stationary control tang 43. This control tang 43 is inserted fixedly into a continuous bore 44 of a housing wall 45 of the adjusting device. An approximately hollow-cylindrical pump housing, which surrounds the control tang 43 and which receives a rotor 47 along with a piston 48 and a support ring 49, is embodied on the outside of this housing wall 45.

The rotor 47 is rotatably supported on the control tang 43 and is supported by one face end on a bearing ring 51, which in turn rests on the housing wall 45 in the interior of the pump housing 46. On the opposite side, the rotor 47 is secured against axial displacement by a securing nut 52, which is screwed to the control tang 43. The rotor 47, on its face end remote from the housing wall 45, has a plurality of drivers 50, which engage a cross-type disk 53. The drivers—not shown of the annular disk 19 engage this cross-type disk 53 from the opposite side, so that the rotor 47 is driven by the camshaft 10 via the cross-type disk 53, the annular disk 19 and the bolts 20.

The rotor 47 has a plurality of pump bores 54, extending radially from its outer circumference; one pressure bore 55, which extends as far as the control tang 43, originates at the bottom of each pump bore. On its outer circumference, the pressure bore has a pressure groove 57, which extends over part of the circumference and which communicates with the portion 59 of the longitudinal bore 42 having the larger diameter via a pressure bore 58.

Between the pump bores 54 and the bearing ring 51, a continuous suction bore 60 into which an intake throttle 61 is inserted extends inside the rotor 47 next to each pump bore. The suction bore 60 is closed on one end by a plug 62 at the outer circumference of the rotor 47. One suction conduit 63, which discharges into the pump bore 54, begins at each suction bore 60 between the intake throttle 61 and the plug 62. The suction bore 60 cooperates with a suction groove 65, which is formed on the control tang 43 over part of its circumferential face. This groove communicates with a blind bore 66, which begins at the face end of the control tang 43 remote from the camshaft 10.

An approximately cup-shaped piston 48 is guided in each of the pump bores 54, and a compression spring 67 is supported in the interior of the piston, its other end resting on the bottom of the pump bore 54. The pistons 48 are embodied as dome-headed pistons, whose dome heads 68 rest on the inside ring 69 of the eccentrically supported support ring 49. This latter ring in turn is supported via balls 70 on the outer face 71, which is supported in the interior of the pump housing 46. The outer ring 71 is secured against axial displacement from the open face end of the pump housing 46, via a spring plate 72 and a securing ring 73.

As already noted above, the actuator 39 protrudes into the longitudinal bore 42 and in the portion 64 thereof having the smaller diameter is sealed off and guided by a sealing ring 76 placed in an annular groove 74 and by a guide ring 77 placed in a second annular groove 75. The open side of the longitudinal bore 42 is covered by a flange plate 78, which is screwed on the outside of the housing wall 45 and—in a manner not shown per se—is screwed to the control tang 43. This flange plate 78 has a continuous bore 79 which is aligned with the longitudinal bore 42. On the inside, resting on the housing wall 45, of the flange plate 78, an inlet slit 81 and a return slit 82 are formed. They are sealed off from the longitudinal bore 42 and the bore 79, respectively, via a sealing ring 83 placed in the flange plate 78. The inlet slit 81 connects the blind bore 66 in the control tang 43 with an inlet bore 84 that penetrates the housing wall 45 outside the pump housing 46. The return slit 82 connects a return bore 85, which penetrates the flange plate 78, with a bore 86 in the housing wall 45. This bore 86 communicates with the interior of the pump housing 46 via a groove 87.

The housing 89 of the control valve 90 is secured to the outside of the flange plate 78. The control valve 90, on its face end resting on the flange plate 78, has a cylindrical indentation 91 that surrounds the bore 79. Extending around this indentation 91 in the control valve 90 is an annular groove 92, which communicates with the return bore 85. Both the indentation 91 and the annular groove 92 are sealed off from the outside by respective sealing rings 93 and 94. The indentation 91 is adjoined in the control valve 90 by a valve insert 96, which has a valve seat 97. This valve seat 97 cooperates with a valve cone 98, which is guided in the armature chamber 99 of the control valve 90. From the armature chamber 99 of the control valve 90, bores 103 lead to the annular groove 92. A compression spring 100 is supported on the valve cone 98, and its other end rests on the armature 101 of the control valve 90. This armature 101 is guided in the interior of the coil 102 of a proportional magnet. When current is supplied to the coil 102 of the proportional magnet, the armature 101 moves toward the valve seat 97, counter to the action of the compression spring 100, thereby increasing the initial tension of the tension spring 100.

The hydraulic adjusting device shown serves the purpose of relative rotation of the camshaft 10 with respect to the drive wheel 11 or the crankshaft—not shown—of an internal combustion engine. The intent is to adjust the opening times of the valves of the engine as a function of various factors, such as rpm or load, specifically for the sake of earlier or later valve actuation, with respect to the rotational position of the crankshaft. This is achieved by displacing the coupling number 23. As a result of the cooperation of the spur gear 26 and the helical gear 27 on the coupling member 23, axial displacement of the coupling member causes a rotation of the drive wheel 11 relative to the camshaft 10. In the right-hand terminal position of the coupling member 23 as shown, the maximum possible timing advance of the camshaft 10 is attained. This terminal position of the coupling member is attained or maintained by the pressure building up in the longitudinal bore 42 or in the bore portion 59, which pressure acts on the actuator 39. When the rotor 47 or the camshaft 10 is revolving, this pressure is built up by the pistons 48, since the pump bores 54 are in communication with the longitudinal bore 42 via the pressure bore 55, the pressure groove 57 and the pressure bore 58. The imposition of pressure fluid on the pump bores 54 is done via the suction conduits 63, the suction bores 60 with the intake throttles 61, and the suction groove 65. This suction groove communicates with the inlet bore 84, via the blind bore 66 and the inlet slit 81. This inlet bore 84 communicates in turn with the motor oil circuit of the engine, which is suggested by the dashed-line connection 105, the pump 106 (lubricant or motor oil pump), also shown in dashed lines, and the container 107. The pump shown here for the adjusting device is accordingly a slit-controlled radial piston pump supported externally and throttled on the intake side.

The pressure in the longitudinal bore 42 can be regulated via the control valve 90. This valve is embodied as a proportional pressure regulating valve, and the pressure present in the longitudinal bore 42 is present at the valve seat 97 via the bore 79. By means of the prestressed compression spring 100, which acts upon the valve cone 98, this pressure is regulated; that is, if a predetermined pressure value is exceeded, the valve cone 98 lifts up from the valve seat 97, so that pressure fluid flows past the opened valve seat 97 into the armature chamber 99. From there, a communication with the interior of the pump housing 46 or with the motor oil circuit exists via the bores 103, the annular groove 92, the return bore 85, and the groove 86. By suitably supplying power to the coil 102 of the electromagnet, the initial stress of the compression spring 100 can be varied, making the opening pressure of the control valve 90 arbitrarily adjustable thereby. If the coupling member 23 (actuator 39) is to be held in the terminal position shown, or displaced to the right from a prior position, then the force upon the coupling member 23 from the pressure building up in the longitudinal bore 42 must be greater than the restoring forces resulting from the valve actuation by the camshaft. Upon actuation of the valves, the camshaft experiences a moment acting in reverse, which has the effect of a timing delay. If the coupling member 23 is to be moved to the left from the position shown or from some arbitrary intermediate position, then the forces resulting from the restoring moment must be greater than those resulting from the pressure building up in the longitudinal bore 42. To that end, the power to the coil 102 of the electromagnet is reduced, so that via the resultant lessening in the prestressing of the compression spring 100, the opening pressure at the valve cone 98 decreases. For maintaining an intermediate position of the coupling member 23 and hence for maintaining the rotational position of the camshaft, the control valve 90 is triggered such that the forces resulting from the action of the pressure in the longitudinal bore 42 and the oppositely directed forces resulting from the restoring moment of the camshaft 10 maintain equilibrium.

Via the longitudinal bore 15 in the camshaft 10 and the longitudinal bore 29 and the indentation 28, the interior of the hub body 16 is made to communicate with the motor oil circuit, so that during operation adequate lubrication of the teeth 26, 27 and of the axial bearing (31–34) is also assured.

In contrast to the prior art, the actuator 39 of the hydraulic adjusting device is embodied as a singleacting cylinder, which can be projected into the longitudinal bore 42 by suitable imposition of pressure. The retraction or restoration of the actuator 39 is brought about solely by the restoring moment during operation of the camshaft 10. The axial bearing 32–34 in the coupling member 23 is loaded substantially only on one side, so that its embodiment is simplified and the fastening of the actuator 39 to the guide disk 33 becomes simpler as well. In order to attain an adequate restoring force on the actuator based on the restoring moment, the helical gear on the coupling member 23 is embodied as substantially steeper than in previously known adjusting devices. The pitch of the helical gear is less than 200 mm per revolution, and preferably is in the range between 110 mm per revolution and 190 mm per revolution. In previously known adjusting devices of this type, the pitch of the helical gear is in the range between approximately 230 mm per revolution and 620 mm per revolution.

Instead of a spur gear and a helical gear on the coupling member 23 and the corresponding gear tooth systems on the camshaft 10 and drive wheel 11, it is also possible for two helical gears to cooperate for purposes of adjustment. The total pitch of the two cooperating pairs of helical gears is then equivalent to that given above, in other words is less than 200 mm per revolution.

In contrast to the embodiment described and shown here for the coupling member and its cooperation with the camshaft and the drive wheel, other constructive versions are also possible. For instance, the gear tooth system of the camshaft may be embodied on a tang mounted on the camshaft and engaging a corresponding (blind) bore in the coupling member. The essential factor is the cooperation of two pairs of gear tooth systems having a suitable pitch rate, so that an axial displacement of the coupling member produces a relative rotation of the camshaft with respect to the drive wheel.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic adjusting device for rotating a camshaft (10) of an internal combustion engine relative to a drive wheel (11) of the engine with an actuator (39), which is acted upon by a pressure of a pump (43, 47, 48, 49), which pressure is variable via a control valve (90), and is connected to a longitudinally displaceable coupling member (23) that via a respective pair of gear tooth systems (26, 27) cooperates with the drive wheel (11) and with the camshaft (10), wherein at least one pair of gear tooth systems (26, 27) is embodied as a helical gear, an actuator (39) is embodied as a single-acting cylinder, whose pressure chamber (42, 59) always communicates with the pump, and total pitch of the pairs of gear tooth systems is less than 200 mm per revolution.

2. A hydraulic adjusting device as defined by claim 1, in which the total pitch of the pairs of gear tooth systems ≧110 mm per revolution.

3. A hydraulic adjusting device as defined by claim 1, in which the pressure chamber (42, 59) of the cylinder is embodied in a control tang (43) of the pump (43, 47–49).

4. A hydraulic adjusting device as defined by claim 2, in which the pressure chamber (42, 59) of the cylinder is embodied in a control tang (43) of the pump (43, 47–49).

5. A hydraulic adjusting device as defined by claim 1, in which the control valve (90) is disposed coaxially with the camshaft (10).

6. A hydraulic adjusting device as defined by claim 2, in which the control valve (90) is disposed coaxially with the camshaft (10).

7. A hydraulic adjusting device as defined by claim 3, in which the control valve (90) is disposed coaxially with the camshaft (10).

8. A hydraulic adjusting device as defined by claim 1, in which one pair of gear tooth systems (26, 27) is embodied as a spur gear.

9. A hydraulic adjusting device as defined by claim 2, in which one pair of gear tooth systems (26, 27) is embodied as a spur gear.

10. A hydraulic adjusting device as defined by claim 3, in which one pair of gear tooth systems (26, 27) is embodied as a spur gear.

11. A hydraulic adjusting device as defined by claim 5, in which one pair of gear tooth systems (26, 27) is embodied as a spur gear.

12. A hydraulic adjusting device as defined by claim 1, in which both pairs of gear tooth systems (26, 27) are embodied as helical gears.

13. A hydraulic adjusting device as defined by claim 2, in which both pairs of gear tooth systems (26, 27) are embodied as helical gears.

14. A hydraulic adjusting device as defined by claim 3, in which both pairs of gear tooth systems (26, 27) are embodied as helical gears.

15. A hydraulic adjusting device as defined by claim 5, in which both pairs of gear tooth systems (26, 27) are embodied as helical gears.

16. A hydraulic adjusting device as defined by claim 1, in which the pump (43, 47, 48, 49) is supported on an outside of a housing wall (45).

17. A hydraulic adjusting device as defined by claim 2, in which the pump (43, 47, 48, 49) is supported on an outside of a housing wall (45).

18. A hydraulic adjusting device as defined by claim 3, in which the pump (43, 47, 48, 49) is supported on an outside of a housing wall (45).

19. A hydraulic adjusting device as defined by claim 1, in which the pump (43, 47, 48, 49) is controlled by an inlet slit (81) and an outlet slit (82).

20. A hydraulic adjusting device as defined by claim 2, in which the pump (43, 47, 48, 49) is controlled by an inlet slit (81) and an outlet slit (82).

21. A hydraulic adjusting device as defined by claim 3, in which the pump (43, 47, 48, 49) is controlled by an inlet slit (81) and an outlet slit (82).

22. A hydraulic adjusting device as defined by claim 1, in which the pump (43, 47–49) is throttled on an intake side by an intake throttle (61).

23. A hydraulic adjusting device as defined by claim 2, in which the pump (43, 47–49) is throttled on an intake side by an intake throttle (61).

24. A hydraulic adjusting device as defined by claim 3, in which the pump (43, 47–49) is throttled on an intake side by an intake throttle (61).

* * * * *